(12) United States Patent
Doering

(10) Patent No.: US 11,815,012 B2
(45) Date of Patent: Nov. 14, 2023

(54) METHOD AND APPARATUS FOR STORING ENERGY

(71) Applicant: Andreas Doering, Unterhaching (DE)

(72) Inventor: Andreas Doering, Unterhaching (DE)

(*) Notice: Subject to any disclaimer, the term of this patent is extended or adjusted under 35 U.S.C. 154(b) by 0 days.

(21) Appl. No.: 17/354,586

(22) Filed: Jun. 22, 2021

(65) Prior Publication Data
US 2022/0403773 A1  Dec. 22, 2022

(51) Int. Cl.
| | |
|---|---|
| *F02B 51/02* | (2006.01) |
| *F02B 53/02* | (2006.01) |
| *F02D 13/02* | (2006.01) |
| *F02B 75/12* | (2006.01) |
| *F02B 43/10* | (2006.01) |
| *B01J 3/04* | (2006.01) |
| *B01J 3/00* | (2006.01) |
| *F02M 27/02* | (2006.01) |
| *C25B 1/04* | (2021.01) |

(52) U.S. Cl.
CPC ............ *F02B 51/02* (2013.01); *B01J 3/002* (2013.01); *B01J 3/04* (2013.01); *F02B 43/10* (2013.01); *F02B 53/02* (2013.01); *F02B 75/12* (2013.01); *F02D 13/0215* (2013.01); *F02M 27/02* (2013.01); *C25B 1/04* (2013.01); *F02B 2043/106* (2013.01)

(58) Field of Classification Search
CPC .......... F02B 51/02; F02B 53/02; F02B 43/10; F02B 2043/106; F02B 75/12; B01J 3/002; B01J 3/04; F02D 13/02; F02D 13/0215; F02M 27/02
See application file for complete search history.

(56) References Cited

U.S. PATENT DOCUMENTS

| | | | | |
|---|---|---|---|---|
| 6,170,442 B1* | 1/2001 | Beale | ................ | F02D 13/0215 123/46 B |
| 8,407,999 B2* | 4/2013 | Gray, Jr. | ................ | F01K 25/08 60/618 |
| 2007/0137595 A1* | 6/2007 | Greenwell | ............ | F01B 13/04 123/43 R |
| 2007/0215520 A1* | 9/2007 | Edwin | .................... | D01F 9/133 208/46 |
| 2008/0141921 A1* | 6/2008 | Hinderks | ............... | F02B 59/00 114/274 |
| 2009/0261590 A1* | 10/2009 | Aritaka | ................... | F01K 3/188 290/55 |
| 2010/0218500 A1* | 9/2010 | Ruer | ...................... | F02G 1/044 60/659 |
| 2015/0377178 A1* | 12/2015 | Bussieres | ................ | F02F 1/14 123/41.72 |
| 2019/0376418 A1* | 12/2019 | Roskilly | ................ | F01K 25/08 |

* cited by examiner

*Primary Examiner* — John Kwon
*Assistant Examiner* — Johnny H Hoang
(74) *Attorney, Agent, or Firm* — Laurence A. Greenberg; Werner H. Stemer; Ralph E. Locher

(57) ABSTRACT

A method and apparatus according to the invention is described, which in a first mode operates as an internal combustion engine delivering energy and in a second mode operates as a pulsed compression reactor converting electrical energy in the form of chemical compounds. In the second mode, at least one of the generated compounds is collected and temporarily stored.

20 Claims, 7 Drawing Sheets

METHOD AND APPARATUS FOR STORING ENERGY

BACKGROUND OF THE INVENTION

Due to the energy transition, the requirements regarding the stabilization of the grid have increased, and the need to balance short-term differences between energy demand and energy supply has increased. In addition, the storage of energy is essential for the feasibility of the energy transition. If the demand for electrical energy exceeds the current supply, combustion engines and/or turbines connected to generators are usually switched on to compensate for this difference. If, on the other hand, more electrical energy is produced than can currently be purchased, it would make sense to store this energy. However, electrochemical energy storage is too expensive, and pumped storage power plants face resistance from the public, so the energy is often simply dissipated to prevent overloading the grids.

An alternative would be to store or convert excess energy in the form of chemical bonds, such as methane, methanol or ammonia. Methane, ammonia, and methanol are usually produced catalytically in flow or fixed bed reactors. Thus, methane is produced from CO, $CO_2$, and $H_2$ according to the Sabatier process:

$$H_2 + CO_2 \rightarrow CO + H_2O$$

$$3H_2 + CO \rightarrow CH_4 + H_2O.$$

The same is true for methanol or ethanol, but less hydrogen is added per carbon atom:

$$CO + 2H_2 \rightarrow CH_3OH$$

$$CO_2 + 3H_2 \rightarrow CH_3OH + H_2O$$

$$2CO + 4H_2 - CH_3CH_2OH + H_2O$$

$$2CO_2 + 6H_2 \rightarrow CH_3CH_2OH + 3H_2O.$$

Ammonia production by the Haber-Bosch process proceeds according to the following equation:

$$N_2 + 3H_2 \rightarrow 2NH_3.$$

All of the above reactions have in common that they take place on a technical scale on solid-state catalysts. While catalysts containing zinc are usually used for methanol production, catalysts containing iron are used in the Haber-Bosch process and catalysts containing nickel are used in the Sabatier process. The use of flow and fixed-bed reactors is common because they are relatively inexpensive and easy to manufacture. However, there are high requirements for the purity of the reactants CO, $CO_2$, $N_2$ and $H_2$. Otherwise, the catalysts used would be contaminated. As a result, these substances have to be purified in a complex process before they are fed into the respective catalytic process. This applies in particular to CO and $CO_2$ if they were formed in a process in which inorganic components such as calcium, sodium, vanadium, sulfur, phosphorus or similar were present. The disadvantage of this type of reactor also lies in its difficult controllability and its long start-up times, i.e. it is not suitable for absorbing short-term load changes in the electrical grid by changing the operating parameters at short notice. In addition, intercooling is necessary due to the strong heat tinting of most reactions. If this is not done, only very low select activities can be achieved. In addition, due to the catalysts used, the reactors are only designed for one specific reaction and can therefore only be used for this one reaction. In addition, it is disadvantageous that the reactor would only be activated during the phases of excess energy in order to store it, i.e., most of the time it stands idle without being used.

BRIEF SUMMARY OF THE INVENTION

Proceeding from the previously described state of the art, it is an object of the present invention, while avoiding the drawbacks of the known arrangements, to provide a method or process as well as an apparatus which in phases of a demand for electrical or mechanical energy, makes it available and, while in phases of a surplus of electrical energy, converts it into at least one chemical bond or compound so that it can be stored. According to the method and apparatus of the invention, in a first mode, the apparatus operates as an internal combustion engine delivering energy, and in a second mode, it operates as a pulsed compression reactor converting electrical energy to the form of chemical compounds. In the second mode, at least one of the generated compounds is collected and temporarily stored.

BRIEF DESCRIPTION OF THE DRAWINGS

The method and apparatus according to the invention will appear more clearly from the following specification in conjunction with the accompanying schematic drawings.

DETAILED DESCRIPTION OF THE INVENTION

Figure 1:
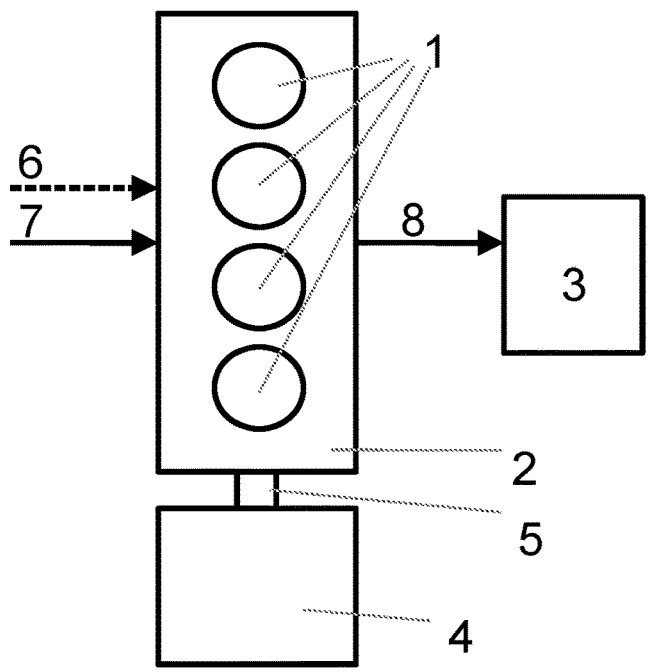
FIG. 1: General overview of the apparatus according to the invention during mode two.

The invention disclosed herein is based on the topic of presenting a method as well as an apparatus which, in phases of a demand for electrical or mechanical energy, makes it available and, while in phases of a surplus of electrical energy, converts the surplus electrical energy into a chemical bond or a compound so that it can be stored.

The method and apparatus according to the invention solves these issues.

For this purpose, a device or an apparatus which can present at least two operating modes is used. In a first operating mode, the apparatus or device serves as a supplier of mechanical or electrical energy, and in a second mode it operates as a chemical reactor by which at least one chemical product, such as, methane, methanol or ammonia, is produced. This at least one product is collected downstream of the apparatus and can subsequently be further processed. Storage and subsequent use as a fuel or combustible is also feasible.

That is, in the first mode, the apparatus supplies energy if there is a demand for electrical energy from the electrical grid, and in the second mode, the electrical energy is stored in the form of a chemical bond if the supply of electrical energy within the electrical grid exceeds the current demand. This is achieved by having a reciprocating engine operate as an internal combustion engine in the first mode and as a pulsed compression reactor or a reciprocating compression reactor in the second mode.

This type of reactor is generally described in, for example, U.S. Pat. No. 8,691,079 B2, U.S. Pat. Nos. 2,814,551, 2,814,552 and in "Pulsed Compression Technology: A Breakthrough in the Production of Hydrogen", M. Glouchenkov and A Kronberg, WHEC 16/Jun. 13-16, 2006". The basic idea is that gaseous reactants are fed into a reaction chamber via at least one inlet valve, and this gas mixture is then compressed via a piston and thus heated. This initiates the desired reaction, after which the pressure and thus the temperature drop again due to the piston movement; the products thus generated then leave the reaction chamber via at least one outlet valve. This process is repeated periodically, comparable to an internal combustion engine. The difference, however, is that in internal combustion engines the main focus is on the energy delivered and the exhaust gas is released into the atmosphere, whereas in pulsed compression reactors, the goal is to obtain usable products. In this way, temperatures of well over a thousand Kelvin and pressures of several hundred bar can be represented for a short period of time without placing too high a load on the reactor components, since the subsequent expansion of the gas causes the reaction mixture to cool and thus reduces the component load. In order to utilize the energy dissipated during the expansion, at least two reaction chambers are usually mechanically coupled in such a way that the expansion of one reaction chamber leads to a compression in the second reaction chamber. This can be realized, for example, by a free-piston arrangement (U.S. Pat. No. 8,691,079 B2), "Pulsed Compression Technology: A Breakthrough in the Production of Hydrogen," M. Glouchenkov and A Kronberg, WHEC 16/Jun. 13-16, 2006). A connection of two opposing, counter-rotating pistons, each closing off a reactor chamber, can also be represented (U.S. Pat. No. 2,814,551). In addition, there are prior art reactors based on reciprocating piston engines that operate as reformers and are used to produce syngas (Lim, Emmanuel G. et al. "The Engine Reformer: Syngas Production in an Engine for Compact Gas-to-Liquids Synthesis." The Canadian Journal of Chemical Engineering 94.4 (2016): 623-635).

According to the invention, it is envisaged that the reactor chambers are in the form of cylinders, in which pistons move along the cylinder axis, and are arranged in a row, respectively in-line. A two-row arrangement in the form of so-called banks is also possible, with the two banks being arranged tilted at an angle of 40° to 120°, preferably at an angle of 42° to 90°, extremely preferably at an angle of 45° to 60° to each other. In both cases, i.e. the in-line or V-shape design, all pistons moving in the cylinders act on a common crankshaft via a connecting rod in each case. In other words, the design is similar to a reciprocating piston engine. A device, e.g. an electric motor, is coupled to this crankshaft, via which the speed of the shaft and thus the residence time in the reaction chambers can be varied, at least in mode two: If the residence time is to be increased, the crankshaft is braked with the at least one device; if the residence time is to be reduced, the crankshaft is accelerated with the device, or the braking torque is reduced. Electrical machines used are, for example, commutators, such as DC or single-phase AC motors, or rotating field machines, such as three-phase asynchronous machines, three-phase synchronous machines, single-phase asynchronous motors, single-phase synchronous motors. Electrical machines, which can be used both as a motor and as a generator are preferable since they can be used in both operating modes of the device according to the invention. When using the electrical machine as a generator, the energy to be dissipated during braking can be converted into electricity and fed into the power grid, used for electrolysis of water, made available to consumers or temporarily stored. When using an electrical machine as a motor, starting the apparatus is very simple, since the crankshaft is accelerated for this case. In addition, reactions can also be represented in which the energy released by the reaction is not sufficient to ensure self-sufficient operation of the apparatus in at least the second mode. This is particularly the case for endothermic reactions. In these cases, the device is driven in the second mode by the electrical machine.

In order to reduce the cost of an electrical machine, a combination of a small electrical machine (for start-up and to compensate for short-term peaks) and a powerful eddy current or brake, which take over most of the braking power, can be used when the power of the compression reactors and the associated braking power of the crankshaft is high. In this case, the amount of produced electrical energy is naturally much lower, but high heat flows are then generated which can be used as process heat. In addition to the design described above as a reciprocating piston machine, a design as a rotary piston machine can also be implemented according to the invention. This is also coupled to a device, e.g. electric machine, by means of which the speed of the rotary piston machine and thus the residence time in the reaction chambers can be changed at least in mode two. In addition, as already described above, this makes it possible to generate electrical energy in mode one. The products formed in mode two can be discharged from the process and further processed. Another variant according to the invention is to collect at least one of the products produced in mode two and store it temporarily for use as fuel at a later time in mode one.

According to the invention, at least one of the products produced in mode two and greater, i.e. in the modes different from mode one, has a calorific value of at least 12 MJ/kg, advantageously of at least 20 MJ/kg, or extremely advantageously of at least 30 MJ/kg. The proportion of the at least one product with a calorific value of at least 12 MJ/kg in the product stream leaving the reactor in mode two is at least 5%, advantageously at least 10%, or extremely advantageously at least 20%.

Advantageously, the process is suitable when the sum of the volumetric calorific values of the products is higher than the sum of the volumetric calorific values of the reactants. The calorific value of all products formed in mode 2 and larger is in sum at least 10 times greater, advantageously at least 20 times greater, or extremely advantageously at least 100 times greater than the calorific value of the waste gas emitted in mode one. Suitable products or chemical energy storage components include $NH_3$, hydrocarbons, such as alkenes, alkanes, alcohols, ethers and esters, such as $CH_4$, $CH_3CH_2OH$, $CH_3OH$, $C_2H_4$, HCHO, dimethyl ether (DME), diethyl ether (DEE) and polyoxymethylenedimethyl ether (POMDME). For this purpose, among others, at least one, advantageously at least two, of the following compounds or their derivatives are fed to the reactor chambers during the second mode: $N_2$, $H_2$, CO, $CO_2$, HCHO, $CH_3OH$, and ethanol.

The reactants for the production of $CH_4$ and $C_2H_4$ are CO and/or $CO_2$ as well as $H_2$, for $NH_3$, $N_2$ and $H_2$, for HCHO, CO and/or $CO_2$ and $H_2$, for $CH_3OH$ and $CH_3CH_2OH$, CO and/or $CO_2$ as well as $H_2$, for DME, $CH_3OH$, for POMDME, $CH_3OH$ and HCHO, for DEE, ethanol. In order to achieve sufficiently high yields in the second mode, the oxygen concentration at the start of the reaction is a maximum of 1%, advantageously a maximum of 0.5%, extremely advantageously a maximum of 500 ppm. This avoids or reduces oxidation of the products and thus a lowering of the calorific value. In the first mode, the air-to-fuel ratio lambda is at least 0.95, advantageously at least 1, extremely advantageously at least 1.3.

For safety reasons, it is convenient to feed combustible reactants, such as hydrogen or methanol, directly upstream of the inlet to the reactor chamber, i.e. downstream of non-combustible reactants, or directly into the reactor chamber.

The compression ratio of the piston reactors is at least 1:8, advantageously at least 1:15, extremely advantageously at least 1:20. The residence time of the reactants in the reactor chamber is at most 1 s, advantageously at most 0.3 s, and extremely advantageously at most 0.01 s.

The crankshaft is surrounded by a so-called crankcase and this is fastened to the reactor walls by screws. The seals used at the joints are static seals, which ensure a significantly better seal to the outside than the dynamic seals on the pistons. However, these dynamic seals of the piston at the cylinder of the reactor chamber are still a critical point, as reactants can enter the crankcase via them. In conjunction with the oxygen present in the environment, this can lead to the formation of explosive mixtures, such as oxyhydrogen gas, and consequently to an explosion or deflagration in the crankcase. If toxic reactants or products are involved, such as formaldehyde, these can escape into the environment, which should also be prevented. According to the invention, this is prevented by flushing the crankcase with non-flammable and non-toxic or low-toxic reactants, such as, $N_2$, CO and/or $CO_2$, which are then fed to the reactor chamber. A further improvement can be achieved if the crankcase or the reactants and products contained therein are sucked out so that a lower pressure is established than in the environment and these reactants are subsequently fed to the reactor chamber.

The at least one flammable or toxic reactant is then also introduced directly upstream of the reactor chamber or, better, directly into the reactor chamber. When reactants are introduced directly into the reactor chamber, the introduction is advantageously carried out according to the invention with the inlet and outlet valves closed.

In order to additionally raise the pressure in the reactor chamber in mode two, it is useful to feed the reactants or educts to the reactor chamber already at elevated pressure. In the simplest case, this can be done via compressors, but a turbocharger arrangement makes more sense in terms of efficiency, especially for exothermic reactions: Here, enthalpy is extracted from the heated product stream via a turbine located downstream of the reactor chambers and transferred via a shaft to a compressor on the reactant inlet side. The pressures on the reactant side and thus ultimately the pressures in the reactor chamber can be varied by suitable measures, such as, discharge valves on the reactant and/or product side, variable turbine and/or compressor geometries.

The apparatus can be operated in the second mode as a two-stroke, four-stroke or four +2*x-stroke apparatus. The following description refers to, but is not limited to, a reactor chamber and an exemplary design as a reciprocating compression piston reactor.

Two-stroke apparatus:
1. intake and compression (piston moves upward)
2. main reaction and expulsion (piston moves downwards).

For this design, valves can, but do not have to, be dispensed with completely, since the piston alternately closes or opens the inlet and outlet.

Four-stroke apparatus:
1. intake (intake open, outlet closed, piston moves downward)
2. compression (inlet and outlet closed, piston moves downward)
3. main reaction and expansion (piston moves down)
4. expulsion/push-out (outlet open, inlet closed, piston moves up).

This setup requires inlet and outlet valves at the reactor chambers. These can be driven by at least one camshaft. Additional devices are known from the engine sector by means of which the opening and closing timings of these valves can be varied and are also used here, such as, piezo actuators, hydraulic valve trains, adjustable camshafts, etc. These measures can be used to influence the reaction conditions in the reactor chamber. For example, it is possible to open the exhaust valve after the third cycle or stroke even before the piston reaches bottom dead center in order to lower the pressure and thus the temperature in the reactor chamber more quickly than would be possible via piston movement alone. In this way, it is possible to freeze the reactions and avoid undesirable side reactions. In addition, the inlet valve can be opened before the top dead center of the piston is reached in the expulsion or push-out stroke, in particular, before the bottom dead center of the piston is reached, so that products flow back to the reactant inlet side. As a result, a mixture of products and reactants is sucked in during the next suction stroke, which increases the yield of products. A similar effect is achieved if the outlet valve remains open during the suction cycle or stroke, so that products are drawn back into the reactor chamber.

Four-stroke+2*x apparatus:

This is a further development of the four-stroke apparatus. In order to increase the yield, the outlet valve is not opened in the fourth cycle or stroke, but at least one more compression and one more reaction cycle or stroke are added.

1. intake (intake open, outlet closed, piston moves down)
2. compression 1 (inlet and outlet closed, piston moves upwards)
3. main reaction 1 and expansion 1 (piston moves downwards)
4. compression 2 (piston moves upwards)
5. main reaction 2 and expansion 2 (piston moves down)
 . . . repeat the compression and main reaction cycle or stroke x times 6+2*x: expulsion/push-out (outlet open, inlet closed, piston moves upwards) x is an element of the natural numbers, so that in sum, cycle or stroke numbers of 6, 8, 10 etc. result. It is often useful to add at least one reactant for the second main reaction. This can be done, for example, by opening the inlet valve or directly adding at least one more reactant via an additional feeding device into the reactor chamber. On the one hand, it is possible to feed one of the reactants that has already been fed in the first main reaction, which on the one hand can increase the yield and/or the selectivity. However, it is also possible to feed at least one reactant that is different from the reactants in the first main reaction, which may selectively produce a different product than in main reaction one. The addition can be done, for example, by opening the inlet valve and sucking it into the reactor chamber or direct addition of at least one reactant via an additional feeding device into the reactor chamber.

Regardless of the number of cycles or strokes, the yield in mode two is further increased according to the invention by removing a partial product stream downstream of the reactor chamber and returning it to the reactor chamber, in particular to the inlet side. The amount of product recirculated in this way can be varied by suitable actuators, such as valves and/or blowers.

Moreover, the reaction in mode two can be influenced by the temperature of the reactants fed to the reactor chamber. For example, the yield of endothermic reactions or reactions with volume increase can be raised if the temperature of the reactants is increased before they enter the reaction chamber. This temperature increase can be accomplished in an energy-efficient manner by thermally coupling the reactant stream to the product stream downstream of the reactor chambers and/or the cooling medium of the compression reactor. The cooling medium is necessary to prevent overheating of the apparatus.

In contrast, for exothermic reactions, such as, methane production from CO or $CO_2$ and $H_2$, or ammonia production from $N_2$ and $H_2$, cooling of the reactants is useful.

Since, as described above, the start of the reaction in mode two often cannot be initiated in a well-defined manner and/or the temperatures have to be raised to such an extent that this has a negative effect on the selectivity, according to the invention, additional energy independently from the compression energy is supplied to the reactor chamber in the short term in order to exceed the activation energy and thus start the reaction. This can be done via at least one of the following methods or devices: Electrical spark, in particular by means of a spark plug, corona discharge, microwaves, or laser pulse.

To further increase the introduction of energy into the reactor chamber, a small, separate ignition reactor chamber can be used, which is connected to the main reactor chamber via openings. In this chamber, a different gas composition is usually selected than in the main reactor chamber by feeding reactants directly into it. For example, an ignitable gas mixture containing oxygen can be provided in this chamber, while the main reactor chamber contains no oxygen or at least significantly less oxygen. The gas mixture contained in the ignition reactor chamber is now ignited, e.g. via a spark plug, and the resulting pressure wave and flame front propagates through the openings into the main reactor chamber, where they start the main reaction.

The reaction can also be started by direct introduction of a compound necessary for accelerating the reaction into the reactor chamber, in particular, of a reactant necessary for the reaction. The introduction is carried out according to the invention with the intake and exhaust valves closed, in particular, at the end of the compression stroke and/or at the beginning of the main reaction stroke, i.e., in the case of two-stroke apparatus, at the end of the first and at the beginning of the second stroke, in the case of four-stroke apparatus, at the end of the second and/or at the beginning of the third, in the case of four+2*x-stroke apparatus, at the end of the second and/or second+x-th and/or at the beginning of the third and/or third+x-th, i.e., in the region of top dead center of the piston with the inlet and outlet valves closed. Since the reaction can only proceed when the reactant required for the reaction is added, an uncontrolled reaction can be ruled out before it is added. A further improvement can be achieved if the necessary reactant is not only added completely at a defined time, but is distributed over several additions. According to the invention, the partial amounts of the individual reactant additions differ.

In order to increase the yield, it is also provided in accordance with the invention to remove a partial product stream downstream of the reactor chambers and to feed it back to the reactor chambers.

The reaction conditions in the reactor chambers are at least 50bar, advantageously at least 60bar, and extremely advantageously at least 70bar. The temperatures before the start of the reactions are between 200° C. and 500° C., advantageously between 250° C. and 450° C., and extremely advantageously between 280° C. and 400° C.

A further improvement of the process is to measure the gas composition downstream of the reactor chamber in mode two and to adjust corresponding process parameters via an electronic control device. If, for example, the yield is too low, the following parameters, among others, can be adjusted: Crankshaft speed is lowered, reactant pressure is raised (for reactions with volume reduction), reactant pressure is lowered (for reactions with volume increase), amount of product returned to the reactant side is raised, the inlet valve is opened before the outlet valve opens, causing the products to flow to the reactant side, the additional energy supplied to the reactor is raised (e.g., raising the ignition voltage), and/or the number of cycles or strokes is raised, especially above four.

If the selectivity is too low, among other things, the following is possible: the speed of the crankshaft is increased, the number of cycles or strokes until push-out is lowered, the reactant pressure is lowered, the amount of product returned to the reactant side is lowered, in the intake cycle or stroke, the inlet valve is closed before reaching bottom dead center, in the expansion cycle or stroke, the outlet and/or the inlet valve is opened before reaching bottom dead center, the number of times additional energy is supplied to the reactor is increased and/or the additional energy is lowered (e.g. several laser pulses or ignition sparks).

If $H_2$ is required for the reaction, it can be produced via electrolysis, for example. In order to increase energy efficiency, it is advisable to use high-temperature electrolysis, whereby the thermal energy required to operate the electrolyzer is supplied at least in part by thermal coupling to the hot product stream. For this purpose, water is evaporated with the aid of the hot product stream and supplied to the electrolyzer at a temperature of at least 500° C., preferably at least 550° C., or extremely preferably at least 600° C. If the thermal energy of the product stream is not sufficient, the water vapor can be thermally coupled to the $H_2$ and/or $O_2$ stream leaving the electrolyzer. In addition, auxiliary heating is possible. A reduction of the investment costs on the side of the hydrogen electrolyzer can be achieved, if CO and $H_2O$ are fed to the reaction chamber of the compression reactor, so that a water gas shift reaction occurs:

$$CO + H_2O \leftrightarrow CO_2 + H_2.$$

Based on this process according to the invention, the amount of $H_2$ that has to be produced via electrolysis, for example, can be lowered by about ⅓ when methanizing CO or $CO_2$. In this process, the necessary hydrogen can already be added in parallel with the water. In order to increase the yield, however, it is advisable to add the hydrogen subsequently. The 4+2*x cycle or stroke operation is particularly advantageous here, i.e. the hydrogen is only added for the second or one of the following reactions, since in this way a separation of the water-gas shift reaction and the methanation can be ensured. Another possibility is to separate the water-gas shift reaction and the methanation spatially, i.e. to let them take place in two different reactor chambers: The water gas shift reaction takes place in a first reactor, and the $CO_2$ and $H_2$ produced there plus the additionally required hydrogen are then fed to the second reactor in which the methanation takes place. Irrespective of the water gas shift reaction, the advantage of this process is that different reaction conditions can be set in the different reactors via reactant temperatures, compression, valve control timings (for inlet and/or outlet valves), reactant pressures, additionally supplied activation energies (e.g. ignition spark), timing of the additionally supplied activation energy. This procedure is particularly useful in the case of a V-shaped arrangement of the reactor chambers: the water gas shift reaction can take place on one bank and the methanation on the other. This procedure is not limited to $CH_4$ production but can be used for all reactions in which the concentration of intermediates is to be influenced.

One way to further increase the yield and selectivity of methane production in mode two is to install a methanation catalyst downstream of the reactor chambers. Nickel, ruthenium, aluminum, cobalt or cerium can be used as active components.

Another improvement is to install catalysts for exhaust gas aftertreatment in the reactor housing required for the methanation catalyst in order to reduce exhaust gas emissions from the internal combustion engine in mode one. Suitable catalysts include, for example, SCR, formaldehyde oxidation and/or $CH_4$ oxidation and/or CO oxidation catalysts.

To prevent reactants from escaping to the outside and/or oxygen from entering from the surroundings during mode two, the air supply required for mode one is cut off via a shut-off device on the intake side. In mode one, the product generated and temporarily stored in mode two can be used as a fuel or combustible, in pure form or as an admixture to other fuels or combustibles. In addition, the following fuels and mixtures containing these substances can be used in mode one: methane, ethane, propane, butane, methanol, ethanol, butanol, propanol, gasoline, diesel, natural gas, DME, DEE, RME, $NH_3$, $H_2$, $NH_3+H_2$, and POMDME. When using carbonaceous fuels in mode one, it is convenient to capture the $CO_2$ formed during combustion, store it temporarily, and then use it as a reactant in mode two. In this case, it is possible to produce hydrocarbon-containing compounds, such as, methane, ethane, ethene, ethyne, ethanol, methanol, DME, and DEE in mode two or greater. Hydrated nitrogen compounds such as ammonia can be produced as energy storage components in mode two or greater by either capturing nitrogen from the exhaust stream during mode one and/or from surrounding air. The advantage of capturing it from the exhaust stream during mode one is, that the oxygen amount is reduced or even zero, as oxygen is reduced during the combustion, forming mainly water, if hydrated nitrogen compounds such as $NH_3$ and/or $H_2$ is used as fuel.

In both cases, namely, the use of hydrocarbons and/or hydrated nitrogen compounds, a closed loop can thus be achieved.

These are collected to be used as fuel at a later stage in mode one. In the case of methane, this can also be fed into the natural gas grid so that it can be made available to other consumers and/or stored in the natural gas grid.

Beyond mode two, the apparatus according to the invention can also be operated in other modes, with either their products or reactants being respectively different from those of the other modes, in particular, from those of mode two. This shows a further advantage of the process or apparatus according to the invention compared to the prior art, since different reactants can be processed, or different products can be produced, with the same reactors.

Another advantage of the process according to the invention is that the compression reactors can be used as compressors and conveyors for the resulting products, especially in modes two and greater. For this purpose, the outlets of the reactors are connected to at least one pressure vessel and/or a downstream process, in particular a process requiring a raised pressure. In the push-out cycle or stroke of the compression reactors, the resulting products are pushed out of the reactor and fed to the pressure vessel. For example, the reactor works at the same time as a piston compressor according to the positive displacement principle. In the best case, an additional compressor or blower for conveying and compressing the at least one product can be dispensed with, or at least they can be designed to be significantly smaller. In exothermic reactions, the energy required for this purpose is provided from the chemical reaction, so that no conversion to another form of energy, such as electrical energy, is necessary. That's the reason, why the efficiency of the method and apparatus according to the invention is significantly higher than that of separately operating chemical flow or fixed-bed reactors and compressors. If the energy from the reaction is not sufficient, the conveying of the products or their compression can be carried out with the help of mechanical energy, which is transferred to the crankshaft via the electric machine.

DESCRIPTION OF SPECIFIC EMBODIMENTS

In the following, the apparatus and the method according to the invention are explained with reference to figures.

FIG. 1 shows the apparatus according to the invention during mode two. The individual reactor chambers (1) are arranged in-line and housed in a common casing. Together they form a reciprocating compression piston apparatus or pulsed compression piston apparatus (2). Via a shaft (5), the compression energy delivered by the reactors or to be supplied to them is transmitted to or from an electric machine (4). The reactants (6) and (7) are fed to the reactor chambers, and the products (8) are discharged from the reactor chambers (1) and collected in a container (3).

Figure 2:
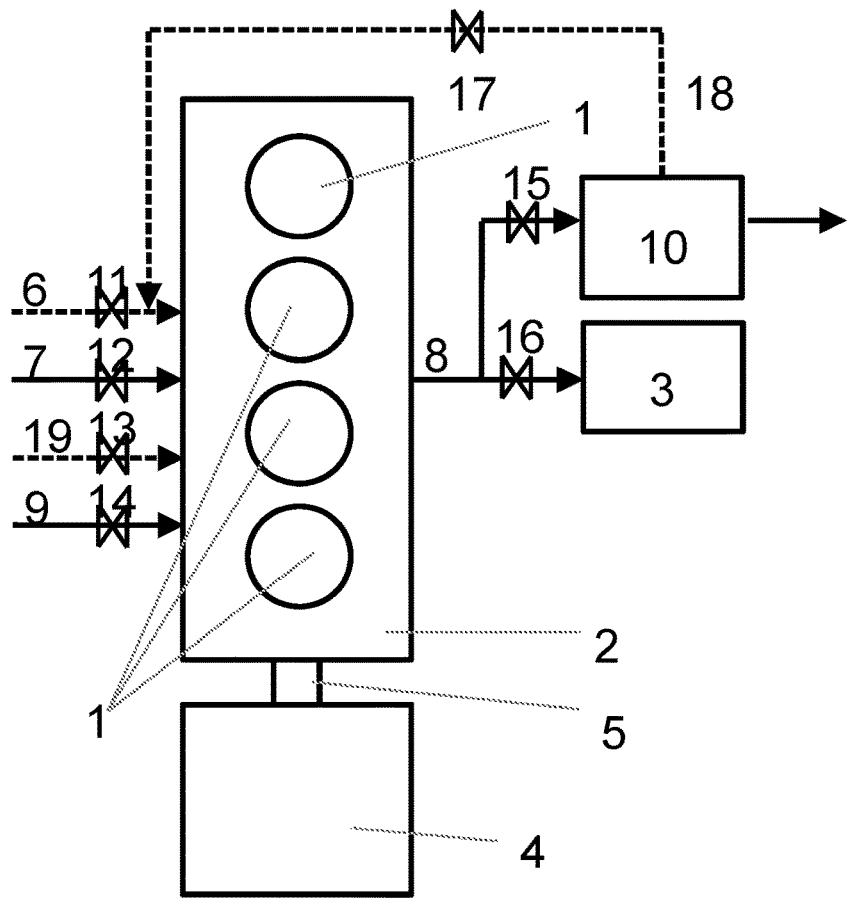
FIG. 2: Overview of the apparatus according to the invention, which can be used as an engine to produce energy and/or can be used as a compression reactor to convert electrical energy into chemical compounds.

FIG. 2 shows a device according to the invention, which can be used both as a combustion engine for the generation of electrical energy and as a pulsed compression reactor for the formation of chemical products. The individual reactor chambers (1) are arranged in-line and housed by a common casing. Together they form a reciprocating compression piston apparatus (2). Via a shaft (5), the compression energy delivered by the reactors or to be supplied to them is transmitted to or from an electric machine (4). In the first mode, in which the apparatus operates as an internal combustion engine, air (9) and fuel (19) are supplied to it through the open valves (13) and (14) and discharged through the valve (15). The valves (11), (12), (16), (17) are closed in this mode. Following the terminology commonly used in internal combustion engines, the reactor chambers can also be referred to as combustion chambers (1). In the second mode, valves (13), (14) and (15) are closed and valves (11), (12) and (16) are opened. As a result, the reactants (6) and (7) are fed to the reactors, and the products (8) are discharged from the reactors (1) and collected in a container (3). To avoid overheating of the apparatus, it is cooled by a suitable cooling medium, such as, water. If several products are formed, a separation of the individual products is arranged downstream of the apparatus, e.g. via membrane processes, gas scrubbing, extraction, rectification, adsorption, condensation (not shown here).

This becomes relevant, for example, when gases are fed in as reactants that result from an oxidation reaction with air, such as occurs during the combustion of hydrocarbons in mode one. In this case, CO and $CO_2$ are formed on the one hand, but in addition large amounts of $N_2$ are present which do not participate in the combustion. If this mixture is fed to the reaction chamber together with $H_2$, hydrocarbons are formed, such as methane, but also water and $NH_3$. This $NH_3$ can be easily absorbed with the help of water fed in a column in countercurrent or co-current flow at temperatures below 30°, preferably below 20° C., extremely preferably below 15° C. The water is then discharged and heated. This water is then discharged and heated to expel the $NH_3$ again, thus "regenerating" the water so that it can absorb $NH_3$ again. It is then cooled and returned to the product stream to absorb more $NH_3$. The water produced in the reaction is also separated from the hydrocarbons in this way. The amount of heat required for the desorption of ammonia can be applied by thermally coupling the desorption unit to the product stream leaving the reactor chambers (1) and/or to the cooling medium of the reactor. If the products formed are not to be further processed but "only" reused as fuel in mode 1, it is often possible to dispense with their separation, in particular the separation of hydrocarbon and hydrogen nitrogen-containing compounds, since both groups of substances have sufficiently high calorific values. For energetic reasons, however, separation of $H_2O$ is useful.

FIG. 2 shows another possible embodiment according to the invention: In the first mode, at least parts of the exhaust gas, such as $CO_2$, are stored in a container (10).

The remaining exhaust gas components, such as water, on the other hand, are discharged into the environment. Since the separation of $CO_2$ is state of the art, reference is hereby made thereto. In mode two, the valve (17) is opened and thus the $CO_2$ formed in mode one is fed to the reactor.

The apparatus can be used to produce methane as product (8) in mode two by adding $CO_2$ and/or CO as reactants, as well as $H_2$. For safety reasons, it is useful to purge the crankcase (32) with $CO_2$ as shown in FIG. 4 (see below).

Furthermore, the production of ammonia is possible by using nitrogen and hydrogen as reactants. In this case, purging the housing (32) with nitrogen is useful. Simultaneous production of $NH_3$ and $CH_4$ is also possible by feeding $CO_2$ and/or CO as well as $H_2$ and nitrogen to the apparatus.

Figure 3:
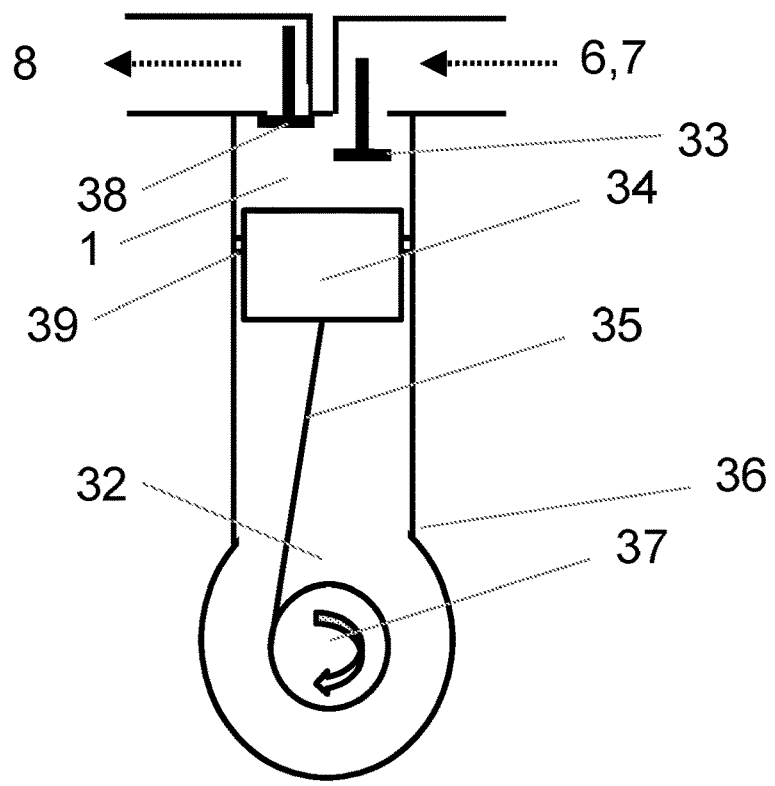
FIG. 3: Four stroke apparatus according to the invention.

FIG. 3 shows a reactor according to the invention based on the four-cycle or four-stroke or the four+2*X-stroke principle: At least two reactants (6, 7) are fed into the reactor chamber (1) via at least one inlet valve (33). The reactants are sucked in and compressed via a piston (34), which is connected to the crankshaft (37) via a connecting rod (35) and moves up and down in a cylinder, and the products (8) are then pushed out. The reactants can be fed to the reactor together through the inlet valve, as shown in FIG. 3. In the case of explosive substances, such as $H_2$, it is advisable for safety reasons to feed them directly into the reactor chamber or at least to add them directly upstream of the inlet valve (not shown here). The compression causes an increase in temperature and pressure, which initiates the desired reaction. The start of the reaction can also be initiated, or precisely controlled or regulated, by supplying additional energy, e.g. in the form of an ignition spark using a spark plug, a laser pulse, a corona discharge or microwave radiation (not shown here). To avoid leakage of reactants and products into the environment, the piston and the crankshaft are surrounded by a housing (32) which is sealed from the environment by means of static seals (36). To prevent large quantities of reactants and products from entering the housing past the piston, the latter is sealed off from the cylinder in which it moves up and down by means of dynamic seals (39). Since it is nevertheless unavoidable that reactants and products penetrate into the housing (32), it is provided in accordance with the invention, in the event that explosive or corrosive substances are involved, that the housing (32) is flushed with a non-corrosive, non-flammable or non-explosive reactant and this is then fed to the reactor chamber (1) (not shown). The at least one inlet and/or outlet valve can be controlled via camshafts, hydraulically or piezoelectrically. Especially the last two variants are to be preferred if a precise control of the reaction conditions and/or four+2*X-strokes are to be represented, since the valve opening timings can be freely chosen.

According to the method of the invention, the control and regulation is carried out with the aid of an electronic control device. At least one of the following variables serves as input variables for the control: Product composition, energy and storage requirements of the power grid, product requirements, speed of the crankshaft, residence time in the reactor chamber, reactant pressure, reactant temperature, product temperature, reactant composition, and product composition. Actuators or manipulated variables are at least one of the following: reactant cooler, reactant heater, reactant pressure controller, energy supplied/discharged by the electrical machine, valve opening timings (inlet valves, outlet valves, reactant inlet valves), product quantity recycled, compression ratio variation, variable turbine geometry, variable compressor geometry, activation timing of the additional energy supplied via a spark plug, laser, microwaves or corona discharge.

Figures 4A, 4B, 4C:
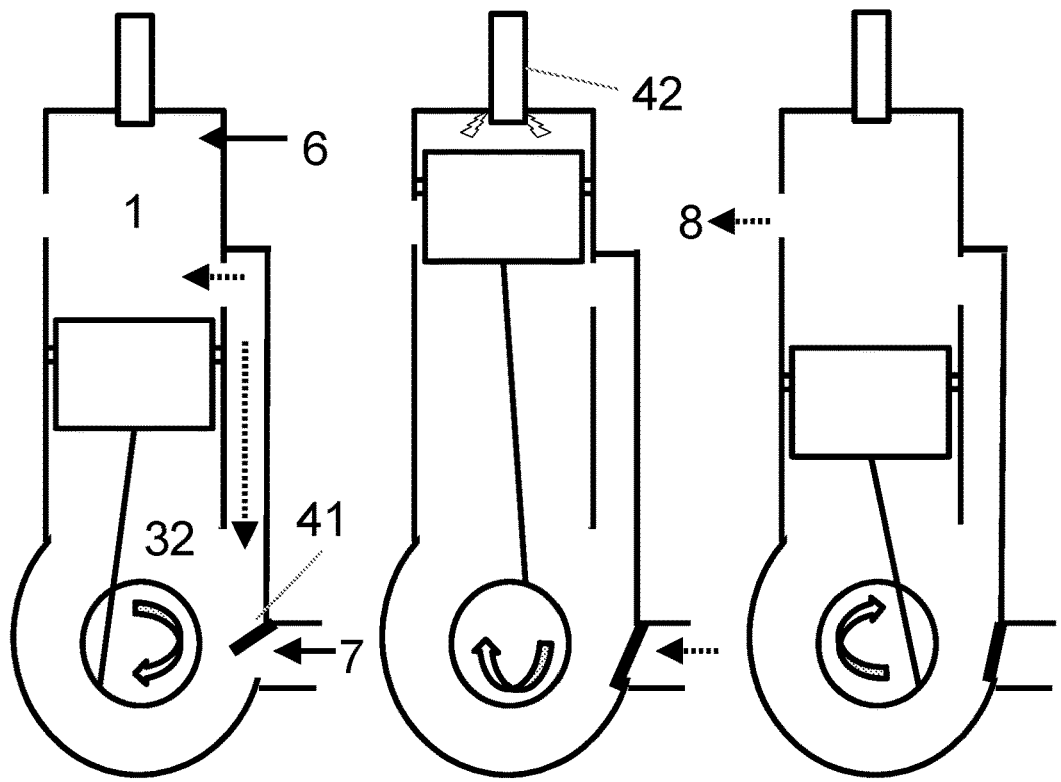
FIG. 4a: Two stroke apparatus according to the invention during the suction stroke.
FIG. 4b: Two stroke apparatus according to the invention during the reaction phase.
FIG. 4c: Two stroke apparatus according to the invention during the ejection stroke.

The purging of the housing (32) is illustrated for the case of a two-stroke apparatus in FIGS. 4a, b, c: According to the invention, in the first cycle or stroke (FIG. 4a), the non-corrosive, non-flammable or non-explosive reactant (7) is fed into the housing (32) via a valve or flap. This flows past the piston into the reactor chamber (1). The second reactant (6) is added to the reactor chamber (1) or directly in front of it (not shown here). The upward movement of the piston compresses the reactants (FIG. 4b) and initiates the reaction. This can be improved, or precisely controlled or regulated, by using a device (42) for feeding compounds to reduce the activation energy and/or a further reactant and/or supplying additional energy, such as a spark plug, a laser pulse, a corona discharge or microwave radiation. In the subsequent ejection stroke (FIG. 4c), the products (8) are ejected from the reactor. The supply of energy in addition to the compression energy and the separate supply of reactants or compounds for lowering the activation energy into the reaction chamber is not limited to the two-stroke apparatus, but can also be used with four- and four+2*X-stroke apparatuses.

Figure 5:
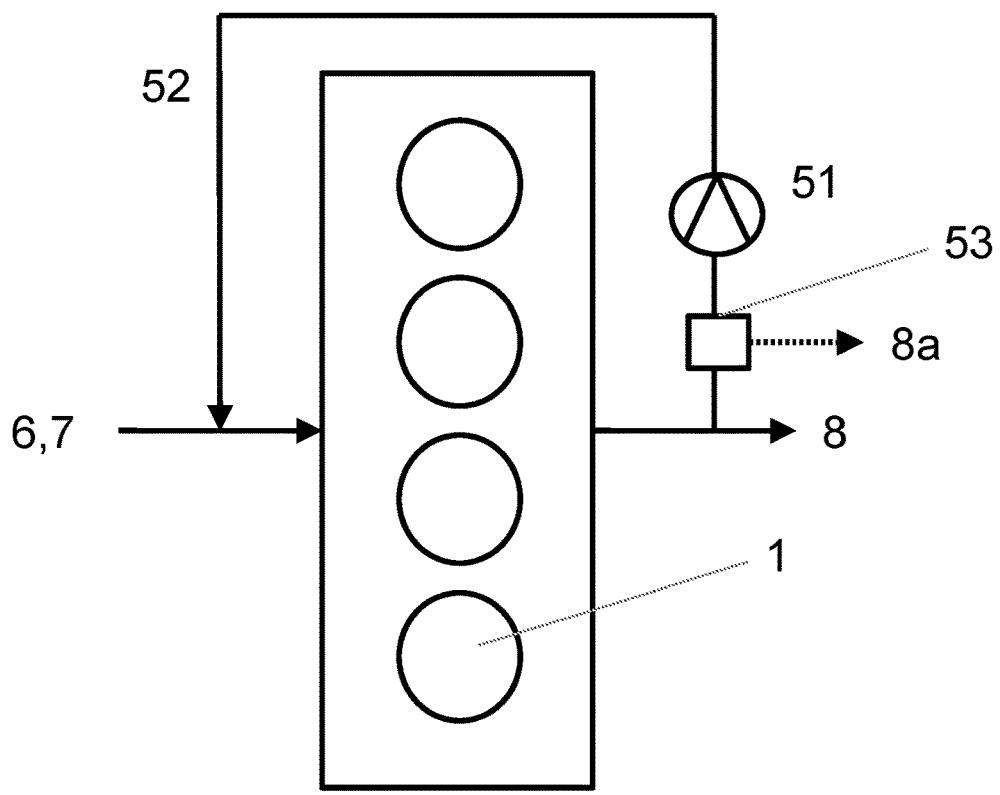
FIG. 5: Apparatus according to the invention with a partial recirculation of products.

FIG. 5 shows a modification of the arrangement chosen in FIGS. 1 and 2 to increase the yield and/or selectivity in mode 2. For reasons of clarity, not all the details shown in FIG. 2 are shown, and in particular only mode two is shown in this and the following figures, i.e. the supply of power or fuel and combustion air for mode one is not shown.

In this case, a product stream (52) is taken downstream of the reactors and this partial product stream, together with the reactants (6,7), is added to the reactors (1). It can be conveyed by a suitable conveying device (51), such as a compressor or a blower. A control of this recirculated product flow with suitable control elements, such as valves or dampers, can also be implemented (not shown). In order to further increase the yield or selectivity, it may be useful to selectively extract respectively separate products (8a) from this stream via a separator device (53). In particular, if the product stream (8) still contains high amounts of reactants or undesired intermediates or by-products. For example, in the production of methane using CO and/or $CO_2$ as well as $H_2$, this involves water being discharged from the circulation.

Figure 6:
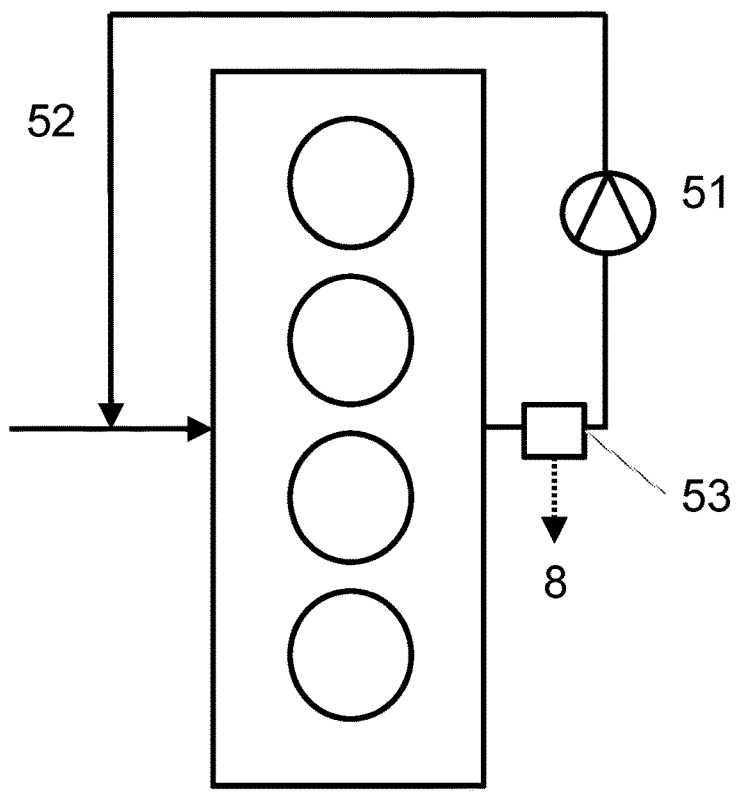
FIG. 6: Apparatus according to the invention with a partial recirculation of products.

A similar setup is shown in FIG. 6, but in this case the separator (53) is located in the main product stream, so that the separation of the product (8) is implemented for the entire product stream.

Figure 7:
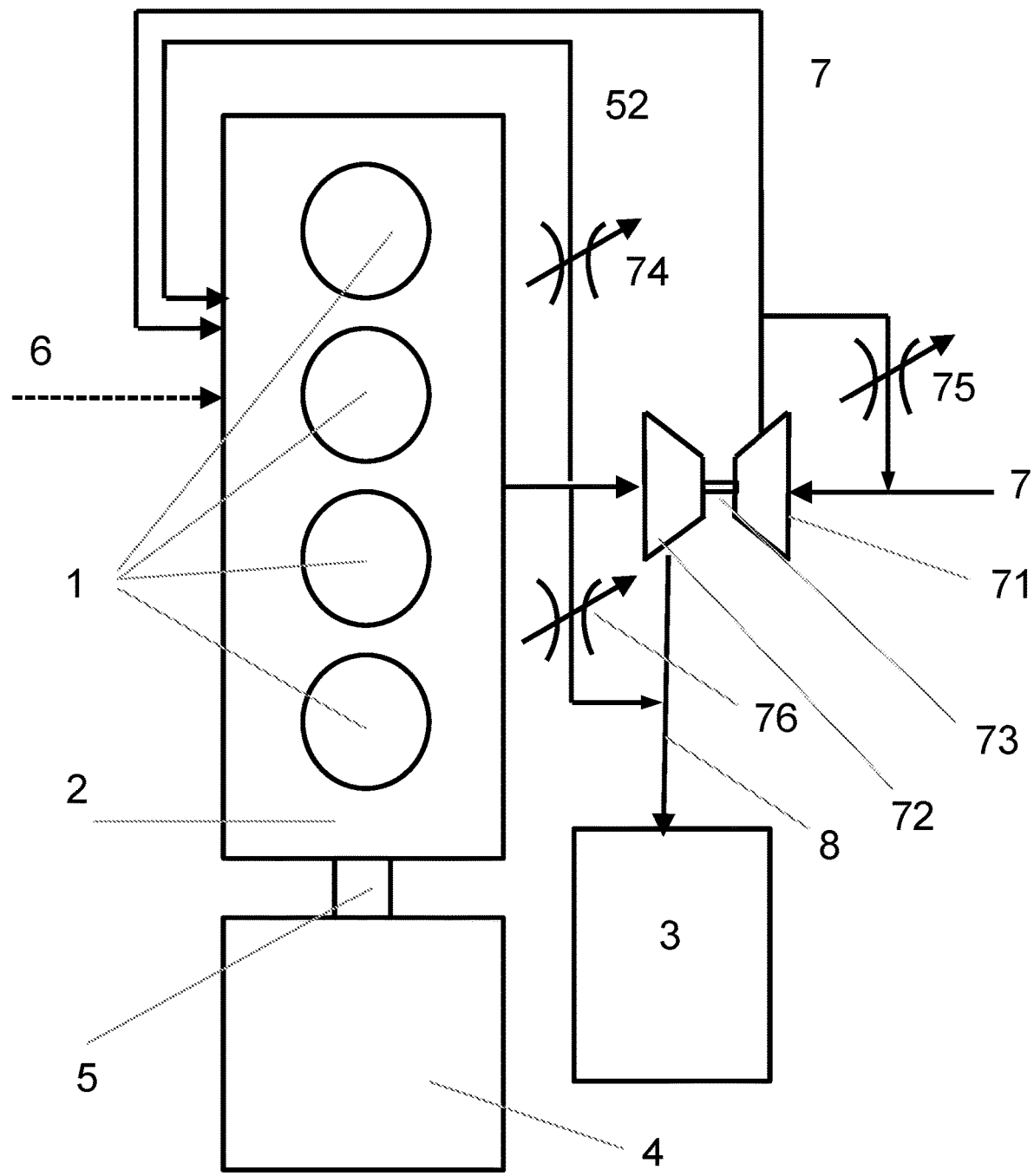
FIG. 7: Embodiment for raising the reactant pressure via a compressor.

FIG. 7 shows an embodiment for raising the reactant pressure in mode two via a compressor (71). The compressed reactant (7) is then fed to the reactors. The second reactant (6) can be added to the reactant (7) upstream of the compressor (not shown), or added directly upstream of the reactors or directly into the reactors. The compressor (71) is connected in a turbocharger setup via a shaft (73) to a turbine (72), via which the product stream (8) is expanded from a high to a lower pressure. The energy released in this process is thus largely reused for compressing the reactants, thus increasing the efficiency of the overall process. The reactant pressure can be varied by suitable devices, such as blowing off the reactant from the high-pressure to the low-pressure side of the compressor via a suitable control element (75) (compressor bypass), blowing off the product from the high-pressure to the low-pressure side of the turbine via a suitable control element (76) (turbine bypass), variable turbine geometry and/or a variable compressor geometry. Moreover, in order to further raise the pressure, the compressor can additionally be driven electrically and/or another compressor can be arranged within the reactant stream. It is also advantageous in this design if the system design is such that the pressure on the reactant side is lower than on the product side, since this allows product that is returned to the reactant side (52) to flow to the reactant side without a conveying device such as compressors, blowers or pumps. The quantity can thereby be varied or controlled via a variable throttle device (74) and an electronic control device. According to the invention, it is provided that at least the temperature of a reactant or of the product recycled to the reactor is controlled or regulated by means of an electronic control device and coolers or heaters (not shown). The arrangement of turbine and compressor described above for mode two can also be used for mode one by interconnecting it in such a way that it is used as a turbocharger to compress the air (9) or oxygen (9a, see FIG. 12) supplied to the combustion chambers. The design as a turbocharger is state of the art, so that a detailed design is omitted. Since both the delivery rates and the temperatures and pressures upstream of the turbine and downstream of the compressor differ from one another in mode one and two, the invention provides for the delivery rates to be adjusted accordingly by means of suitable control elements, such as turbine bypass (76), compressor bypass, variable compressor geometry or variable turbine geometry.

Figure 8:
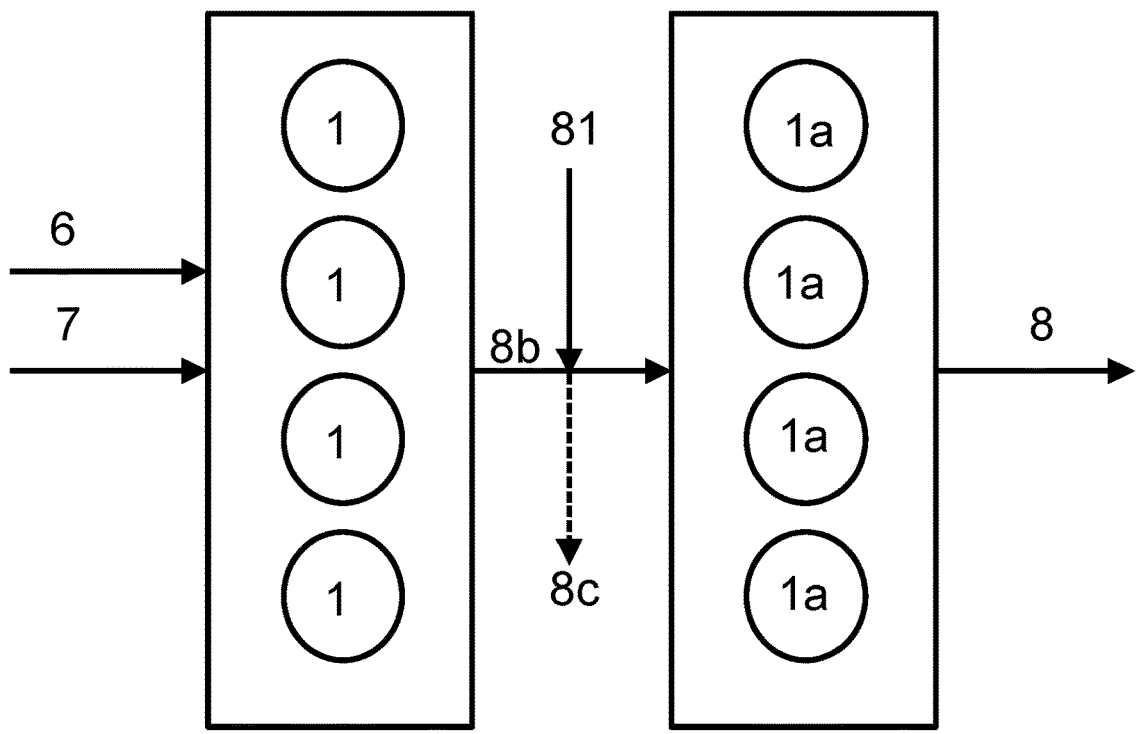
FIG. 8: Series arrangement of reactor chambers in respect to flow.
Figure 9:
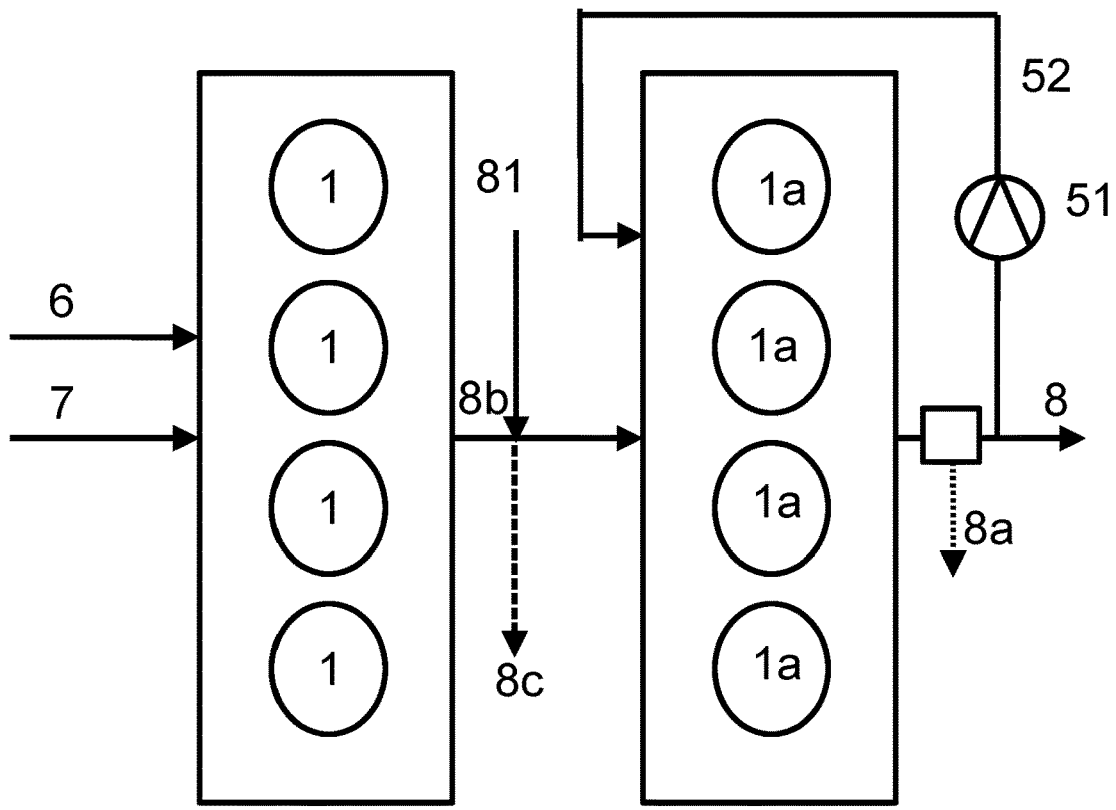
FIG. 9: Series arrangement of reactor chambers in respect to flow and partial recirculation of products.

FIGS. 8 and 9 show a series arrangement of several reactors (1) and (1a) in respect of flow. The reactors (1) and (1a) can differ in their geometry, such as, piston geometry, diameter and/or stroke, or in their operating parameters, such as temperature, pressure and/or additional energy supplied. This makes it possible to further process an intermediate product (8b) leaving the first reactors (1) with modified reaction conditions, resulting in the final product (8). Between the two reactors, another reactant (81) can be fed and/or an intermediate product (8c) can be discharged. The process can be further improved if a product formed in the second reactor (1a) or unused reactants (52) are fed to the second reactor (1a) or first reactor (1) (not shown).

For example, according to the invention, methanol is produced from $CO_2$ and $H_2$ in the first reactors (1):

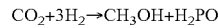

$$CO_2 + 3H_2 \rightarrow CH_3OH + H_2PO$$

while in the second reactors (1a) dimethyl ether (OME) is formed with separation of $H_2O$ (8c):

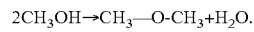

$$2CH_3OH \rightarrow CH_3\text{—}O\text{-}CH_3 + H_2O.$$

Between the two reactors, an intermediate (8c), in this case $H_2O$, is removed from the first reaction. This serves to shift the equilibrium to the side of DME (8). This can be further improved if the water formed in the second reactor is removed from the product stream (8a) and this anhydrous product stream (52) is returned to the reactor chambers (1a) (FIG. 9).

Figure 10:
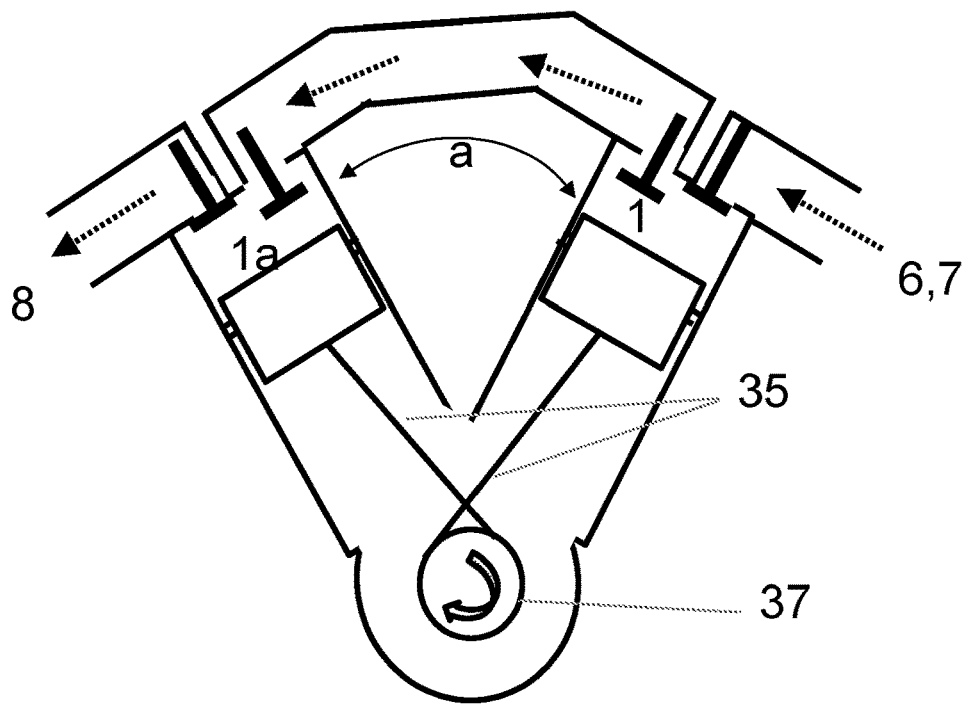
FIG. 10: Series arrangement of reactor chambers in the form of a V-shape apparatus.

The two reactor rows can be constructed as separate independent units, i.e. separate piston machines, in the event that different residence times are to be realized in the two reactor rows; however, according to the invention, it is also possible to arrange both rows in such a way that their pistons act on a common crankshaft (37) via the connecting rods (35). This is particularly useful if the residence times in the two reactor rows are to be identical. To ensure this, the two rows are arranged in a V-shape relative to each other, the angle of the two legs being marked as "a" in FIG. 10.

Figure 11:
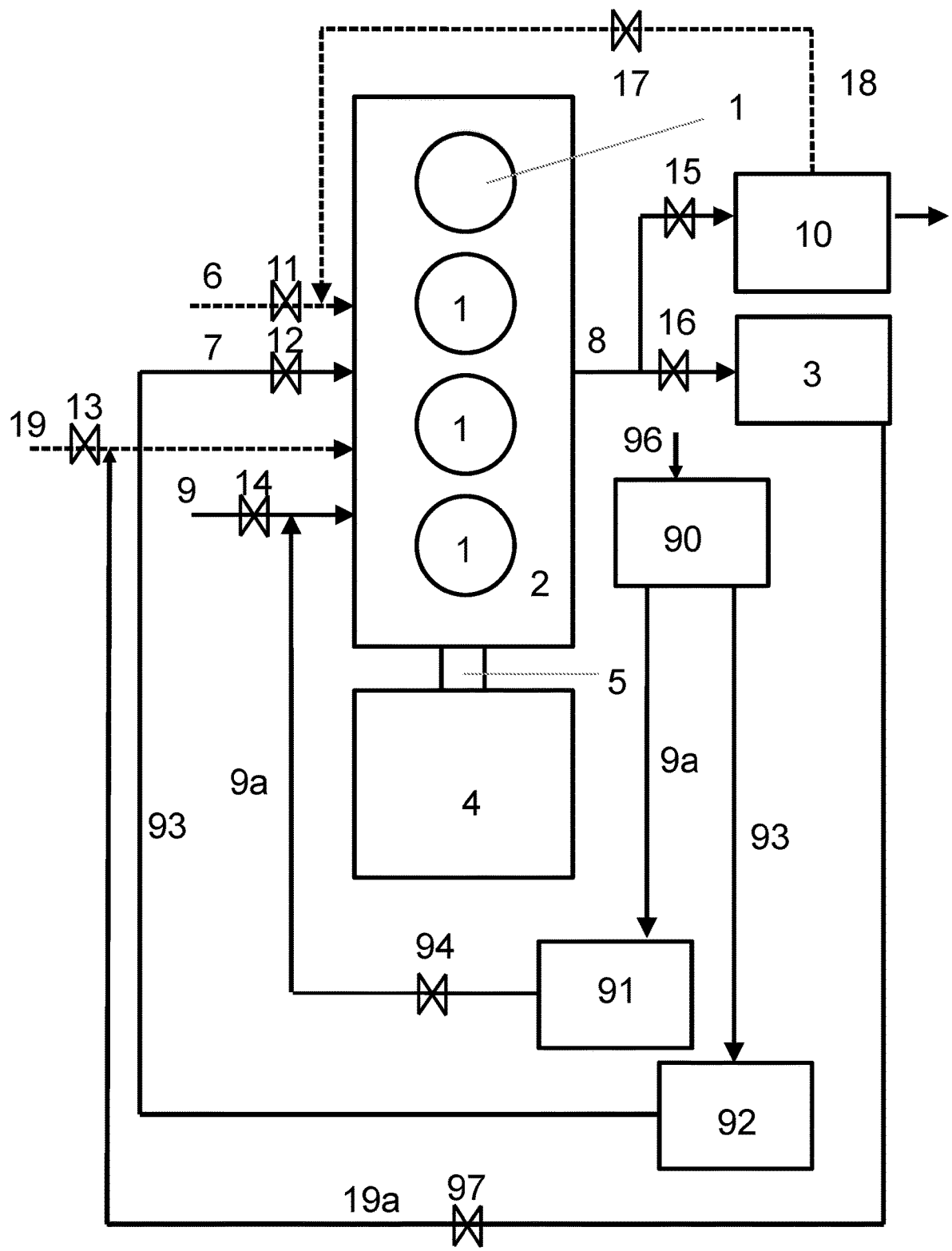
FIG. 11: Another general overview of the process.

FIG. 11 shows a variant and a method of the device shown in FIG. 2. In addition to the components already described in FIG. 2, a device (90) for splitting water (96) into hydrogen (93) and oxygen (9a) using electrical energy is also shown. This splitting of water is illustrated using an electrolyzer, a high-temperature electrolyzer may be used to improve yields. To increase the efficiency, this can be thermally coupled to the product stream (8) and/or the cooling of the reciprocating machine (2). The water (96) required for this electrolyzer can be supplied externally. It is also possible to use water formed in modes one or two.

The process according to the invention is described below using the example of a $CH_4$-based process. In principle, the valve configuration described for FIG. 2 applies; deviating configurations are described below.

In mode one, $CH_4$ (19) is fed as fuel to the device and the reactor chambers (1). When the methane is burned with the help of oxygen (9a), CO and $CO_2$ are formed, which are collected and temporarily stored in the tank (10). In mode two the hydrogen (93) leaving the electrolyzer (90) is fed to the reactor chambers (1) together with the intermediately stored CO or $CO_2$ (18), forming $CH_4$.which is intermediately stored in the tank (3). For this purpose, the valves (12) and (17) and (16) are opened, and the valves (15, 13, 97, 94, 14) are closed. If the quantity of CO and $CO_2$ stored in the container (10) is not sufficient, CO and/or $CO_2$ (6) can be supplied from outside the circuit by opening the valve (11). If, on the other hand, the stored quantity is sufficient, the valve (11) remains closed. The oxygen (9a) formed by electrolysis in mode two is temporarily stored in the tank (91), with the valve (94) closed. In mode one, the valve (94) is opened and thus oxygen (9a) is supplied to the combustion or reactor chambers (1). In addition, the valve (97) is opened, through which the $CH_4$ stored in the container (3), which was formed in mode two, is supplied to the combustion or reactor chambers (1) as fuel. If the amount of $CH_4$ stored in the tank (3) is not sufficient, additional fuel (19) can be supplied to the reactor chambers (1) by opening the valve (13). The advantage of using oxygen (9a) formed during electrolysis instead of air (9) is that no nitrogen is present in the process. On the one hand, this has the advantage that in mode one no nitrogen oxides can form during the combustion of the $CH_4$ due to the absence of nitrogen. As a result, downstream catalysts to reduce nitrogen oxide emissions in mode one are not required.

The second advantage is that in mode one, separation of the nitrogen from CO or $CO_2$ downstream of the combustion or reactor chambers and upstream of the storage vessel (10) can be omitted or the vessel 10 can be made smaller, since no inert nitrogen needs to be stored. Another advantage is that, also in mode one, combustion with oxygen can present a higher output with identical combustion chamber pressure and thus mechanical stress on the components. In addition, combustion with oxygen offers the advantage that a higher $CH_4$ conversion rate is achieved in mode one due to the improved combustion. This results in improved efficiency and lower emissions of unburned $CH_4$.

If the amount of oxygen stored in the tank (91) during mode two is not sufficient for mode one, additional oxygen can be supplied via the valve (14). Air can also be supplied, but this introduces nitrogen into the circuit. This must then be removed again. However, with sufficient $H_2$ supply, the parallel formation of $CH_4$ and $NH_3$ is also possible. Since $NH_3$ can also be used as fuel, it is not necessary to separate $CH_4$; instead, the $CH_4/NH_3$ mixture can be fed back as fuel to reactor chambers (1) in mode one. However, this places higher demands on the control of the combustion in mode one. For this reason, as a further process control according to the invention, it is envisaged to operate the electrolyzer (90) also in mode one in order to generate sufficient oxygen (9a) for the combustion. The hydrogen (93) formed in parallel in this process is temporarily stored in the tank (92) for mode two. If the amount of hydrogen formed exceeds the storage capacity or if the admixture of $H_2$ positively influences combustion in mode one, $H_2$ can also be added to the combustion chambers (1) in mode one. This is particularly useful for the combustion of $NH_3$ in mode one. Regardless of the circulation described above, the products formed in the reciprocating machine and/or the electrolyzer can be discharged from the circulation and used elsewhere (not shown here).

In the above example, the apparatus and process are shown from energy generation and energy storage using $CH_4$ as the storage component. However, the process is not limited to methane, but is suitable for all compounds that have a sufficiently high calorific value, especially above 12 MJ/kg. In particular, $NH_3$ lends itself to this by using nitrogen and hydrogen, instead of CO and/or $CO_2$ and $H_2$, as reactants in mode two. First, nitrogen does not have to be removed from the circulation for this purpose, since it is an integral part of the process. Secondly, the ammonia formed in mode two can be liquefied very easily by a slight increase in pressure (to approx. 8bar at 20° C.), which allows a significantly higher storage density and thus lower storage volumes to be realized compared with $CH_4$. The same applies to longer-chain hydrocarbons, alcohols, ethers or esters as storage components, such as POMDME, DEE, DME, methanol, ethanol, propanol, propane or butane, which can either be liquefied at low pressure or are already liquid at room temperature. Particularly when $NH_3$ is used as a storage medium, it is a good idea in mode one to additionally feed hydrogen (93) to the combustion chambers (1) in order to improve the ignition of the $NH_3$ fed in and thus the stability of combustion. In the case of hydrogen-containing storage media that contain a carbon-oxygen bond, such as methanol, a further process mode is suitable: In this case, in the first mode, hydrogen and $CO_2$ are produced and separated from each other using a reformer. The hydrogen is fed to the compression reactors as fuel, while $CO_2$ is stored. In the second mode, this $CO_2$ is fed to the compression reactors together with hydrogen produced via water splitting, and methanol is produced as already described above. The oxygen produced during water splitting, e.g. via electrolysis, can be fed to the reactors for oxidation of the hydrogen in mode one, as already described above.

Figure 12:
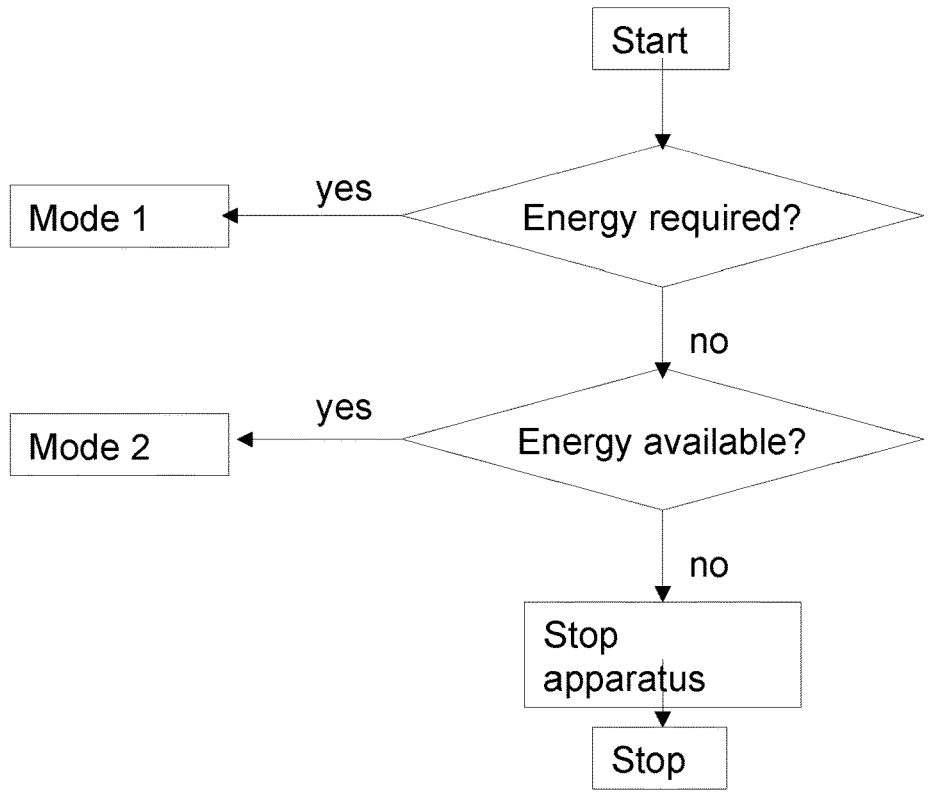
FIG. 12: Flowchart of the electronic control device program to switch between mode 1 and 2.

The switching between mode 1 and mode 2 of the apparatus according to the invention is shown with the aid of an electronic control device in the flowchart represented in FIG. 12: After the start of the program, it is checked whether electrical or mechanical energy is required. If this is the case, the electronic control device activates mode 1 and opens or closes the valves described in the previous figures and periodically activates corresponding ignition or fuel supply devices to operate the device according to the invention as a combustion engine. If, on the other hand, no energy is required, but electrical energy is available or is to be stored, the electronic control device puts the device according to the invention into mode two by opening or closing the corresponding valves. Moreover, the electronic control device can be used to supply the actively additional activation energy. That is, the device according to the invention then operates as a pulsed compression reactor to convert electrical energy into chemical compounds. For the explanation of which valves are closed or opened in which mode, please refer to the explanations of the preceding figures. In the case that energy is neither required, nor available, nor to be stored, the device is stopped. In the event that other reactants are to be used, or other products are to be produced than in mode two, the electronic control device can be used to switch to a mode that is different from modes one and two. This can be done by additional valves and/or control devices or different operating parameters (not shown here), but in the simplest case only process parameters are changed. For example, in mode two ammonia can be produced from $N_2$ and $H_2$, in mode three methane can be produced from $CO_2$ and $H_2$, and in a mode four methanol can be produced also from $CO_2$ but with less $H_2$. In addition, the product of a mode, which is different from mode one, can serve as the reactant of a mode different from one. For example, methanol from one mode can be used to produce DME in another mode. In contrast to the state of the art in fixed bed or flow reactors, which must first be ramped up at length, often over several minutes or hours, in the process according to the invention, it is possible to switch very quickly between the individual modes, in particular from mode 1 to one of the others. For example, switching from the "energy delivery" mode to one of the "energy storage" modes and back can be performed highly dynamically, in particular within a few working cycles or strokes, since the compression reactors are already at operating temperature.

In addition, at least when the device is not in mode one or at a standstill, the electronic control device takes over the regulation of at least one, advantageously at least two, extremely advantageously at least three of the following corresponding process parameters, which were described above or the corresponding actuators, such as: valve opening timings of the at least one inlet valve, valve opening timings of the at least one outlet valve, valve closing timings of the at least one inlet valve, valve closing timings of the at least one outlet valve, timing of a reactant added directly into the reactor chamber, crankshaft speed, reactant pressure of at least one reactant, educt temperature of at least one educt, educt composition, recirculated product quantity, temperature of the recirculated products, variation in the number of cycles or strokes, compression ratio, timing of an additionally supplied activation energy independent of the compression energy, energy quantity of the additionally supplied activation energy, and the number of additionally supplied activation energies per cycle or stroke.

For this purpose, this control unit evaluates corresponding sensors, such as temperature, pressure, rotational speed and flow sensors, in particular for the reactants, in order to represent a closed control loop and to achieve the respective desired product composition for the respective mode. According to the invention, it is further provided to determine the product composition also with corresponding sensors, such as $NH_3$, $CO_2$, CO, $CH_4$— sensors and/or with the aid of analyzers, such as gas chromatographs, IR, UV, FID analyzers, FTIR and/or mass spectrometers and to change the process parameters described above in such a way that a high yield of desired products is achieved.

The invention claimed is:

1. A method for storing electrical energy and producing electrical energy at different points in time by operating a reciprocating or rotary piston apparatus in a first mode and in a second mode, the reciprocating or rotary piston apparatus connected to a rotating shaft and an electric machine connected to the rotating shaft, the method which comprises:
   during a first time period, operating the reciprocating or rotary piston apparatus as a combustion engine to produce electrical energy in the first mode, wherein a first plurality of valves are open in the first mode to feed combustible materials to a plurality of chambers of the reciprocating or rotary piston apparatus; and
   during a second time period, operating the reciprocating or rotary piston apparatus as a pulsed compression reactor in the second mode to store electrical energy by producing at least one product having a calorific value of at least 12 MJ/kg, wherein all of the first plurality of valves are closed so that the combustible materials are not fed to the plurality of chambers of the reciprocating or rotary piston apparatus in the second mode and a second plurality of valves are open to feed reactants to the plurality of chambers of the reciprocating or rotary piston apparatus in the second mode.

2. The method according to claim 1, wherein the at calorific value of the at least one product is at least 30 MJ/kg.

3. The method according to claim 1, which comprises: collecting and temporarily storing the at least one product that is produced in the second mode; and subsequently using the at least one product as fuel when operating the reciprocating or rotary piston apparatus as the combustion engine to produce electrical energy in the first mode.

4. The method according to claim 1, wherein a total calorific value of all products formed in the second mode is at least 10 times greater than a calorific value of all exhaust gas emitted in the first mode.

5. The method according to claim 1, which comprises:
   during the second mode, feeding, to reactor chambers, at least one compound or derivative thereof selected from the group consisting of: N2, H2, CO, CO2, HCHO, CH3OH, ethanol, and methanol; and
   wherein an oxygen concentration at a beginning of reactions in the reactor chambers is at most 1%.

6. The method according to claim 1, which comprises: raising a reactant pressure in the pulsed compression reactor during the second mode by a compressor connected via a shaft to a turbine driven by a product stream leaving a reaction chamber.

7. The method according to claim 1, which comprises:
   extracting at least one substance selected from the group consisting of a reactant, a partial product stream, and a product from a total product stream; and
   feeding the at least one substance back to a reaction chamber.

8. The method according to claim 1, which comprises:
   producing hydrogen and oxygen by splitting water with an electrolyzer in the second mode; and
   performing at least one operation selected from the group consisting of: 1) feeding the hydrogen formed in the second mode to reactor chambers of the reciprocating or rotary piston apparatus, and 2) storing the oxygen formed in the second mode and then feeding the oxygen to the reactor chambers of the reciprocating or rotary piston apparatus in the first mode.

9. The method according to claim 1, which comprises:
   changing, with at least one electronic control device, at least one variable selected from the group consisting of: valve opening timings of at least one inlet valve, valve opening timings of at least one outlet valve, valve closing timings of at least one inlet valve, valve closing timings of at least one outlet valve, timings of a reactant added directly into a reactor chamber, a shaft speed, a pressure of at least one reactant, a temperature of at least one reactant, a reactant composition, a recycled product quantity, a temperature of recycled products, a number of stroke cycles, a compression ratio, a timing of additionally supplied activation energy, a quantity of additionally supplied activation energy, a number of additionally supplied activation energies per stroke cycle.

10. The method according to claim 1, which comprises:
    in the second mode, forming at least one compound selected from the group consisting of: NH3, alkenes, alkanes, alcohols, ethers, esters, CH4, CH3CH2OH, CH3OH, C2H4, HCHO, dimethyl ether, diethyl ether and polyoxymethylenedimethyl ether.

11. The method according to claim 1, which comprises:
    in the second mode, operating the reciprocating or rotary piston apparatus as a two-stroke apparatus, a four-stroke apparatus, or a four+2*x-stroke apparatus;
    wherein when the reciprocating or rotary piston apparatus is operated as the four+2*x-stroke apparatus in the second mode, a third stroke is followed by a number x of compression and expansion strokes before products are pushed out of a reactor chamber of the reciprocating or rotary piston apparatus, wherein x is a natural number.

12. The method according to claim 1, which comprises: switching between the first mode and the second mode automatically by an electronic control device based on an energy demand or an energy production.

13. The method according to claim 1, wherein the reciprocating or rotary piston apparatus includes at least two reaction chambers arranged one behind another in a flow direction.

14. The method according to claim 1, which comprises:
performing at least one operation selected from the group consisting of: supplying at least one reactant and extracting at least one product downstream of a first reactor chamber of the reciprocating or rotary piston apparatus and upstream of a second reactor chamber of the reciprocating or rotary piston apparatus;
wherein the first reactor chamber and the second reactor chamber are arranged one behind another in a flow direction.

15. The method according to claim 1, which comprises:
providing a small, separate ignition reactor chamber that is connected to a main reactor chamber via openings;
igniting a gas mixture located in the ignition reactor chamber and a resulting pressure wave and flame front propagates through openings into said main reactor chamber to initiate the start of reaction in said main reactor chamber.

16. The method according to claim 1, which comprises: purging a crankcase of the reciprocating or rotary piston apparatus with an inert gas while operating the reciprocating or rotary piston apparatus in the second mode.

17. The method according to claim 1, which comprises: arranging at least one catalyst downstream of reaction chambers of the reciprocating or rotary piston apparatus.

18. The method according to claim 1, wherein a proportion of the at least one product in a product stream leaving the pulsed compression reactor in the second mode is at least 5% of an entire amount of the product stream.

19. An apparatus, comprising:
a reciprocating or rotary piston apparatus including a first plurality of valves, a second plurality of valves, and a plurality of chambers, said reciprocating or rotary piston apparatus configured to be operated in a first mode and in a second mode, said reciprocating or rotary piston apparatus configured to operate as a combustion engine in the first mode to produce energy, said reciprocating or rotary piston apparatus configured to operate as a pulsed compression reactor in the second mode to convert electrical energy into at least one chemical product having a calorific value of at least 12 MJ/kg; and
an electronic control device configured for controlling said reciprocating or rotary piston apparatus;
said electronic control device configured to control said first plurality of valves to be open in the first mode to feed combustible materials to said plurality of chambers of said reciprocating or rotary piston apparatus; and
said electronic control device configured to control all of said first plurality of valves to be closed in the second mode so that the combustible materials are not fed to said plurality of chambers of said reciprocating or rotary piston apparatus in the second mode, and said electronic control device configured to control said second plurality of valves to be open in the second mode to feed reactants to said plurality of chambers of said reciprocating or rotary piston apparatus in the second mode.

20. The apparatus according to claim 19, comprising:
a rotating shaft and an electric machine connected to the rotating shaft;
said reciprocating or rotary piston apparatus including reactor chambers configured for supplying energy to said rotating shaft and for obtaining energy from said rotating shaft; and
said electronic control device and said electric machine configured for controlling at least a rotating speed of said rotating shaft and thus a residence time in said reaction chambers.

* * * * *